United States Patent [19]

Yan et al.

[11] Patent Number: 5,209,529
[45] Date of Patent: May 11, 1993

[54] SECONDARY RETENTION CLIP WITH PIVOTING CLAMPING JAWS

[75] Inventors: Yingli Yan, Shelby Township; Timothy J. Burns, St. Clair, both of Mich.

[73] Assignee: Emhart Inc., Newark, Del.

[21] Appl. No.: 838,583

[22] Filed: Feb. 18, 1992

[51] Int. Cl.⁵ .............................................. F16L 35/00
[52] U.S. Cl. ................................... 285/320; 285/318; 285/420; 285/87; 285/924
[58] Field of Search ............... 285/320, 318, 924, 420, 285/117, 45, 61, 82, 87, 88; 248/74.4, 74.2, 71

[56] References Cited

U.S. PATENT DOCUMENTS

| | | | |
|---|---|---|---|
| Re. 33,946 | 6/1992 | Corzine | 285/318 |
| 3,453,005 | 7/1969 | Foults | 285/924 |
| 4,055,359 | 10/1977 | McWethy | 285/924 |
| 4,728,130 | 3/1988 | Corzine | 285/318 |
| 4,913,468 | 4/1990 | Rattmann | 285/82 |
| 5,002,314 | 3/1991 | Smith | 285/318 |
| 5,033,701 | 7/1991 | Kraus | 248/71 |
| 5,112,085 | 5/1992 | Busch et al. | 285/318 |

FOREIGN PATENT DOCUMENTS 2404284  8/1975  Fed. Rep. of Germany ..... 248/74.4

*Primary Examiner*—Eric K. Nicholson
*Attorney, Agent, or Firm*—Spencer T. Smith

[57] ABSTRACT

A secondary retention clip to prevent the complete separation of the female end of an air conditioning hose from a connected male end. The female end is flared and the male end has a coupling flange which receives the flared female end. The clip has a box like receptacle for the coupling flange. The connected tubes are located in side openings which communicate with a open top. Stops prevent entry of the flared portion so that the clip will be attached with the parts properly connected. Clamping jaws secure the hose in position and prevent its vibration.

3 Claims, 2 Drawing Sheets

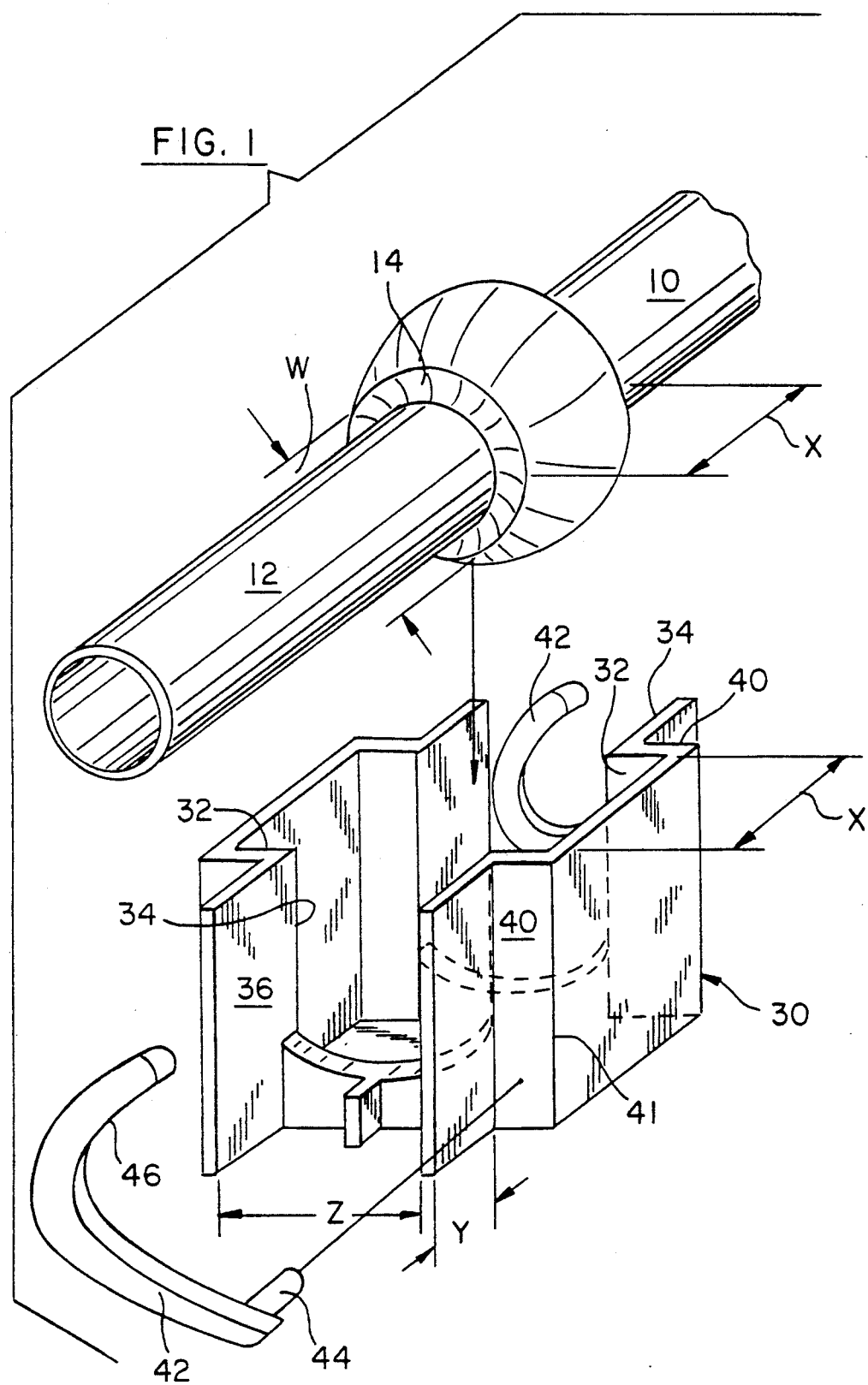

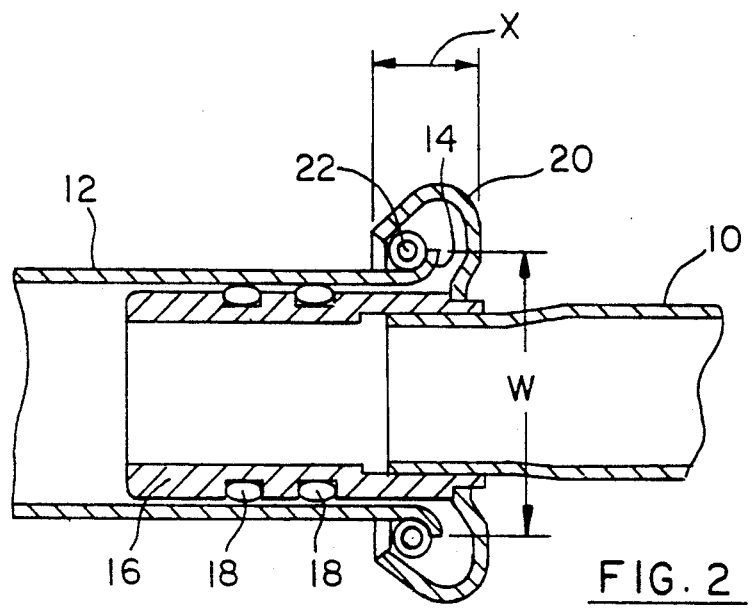
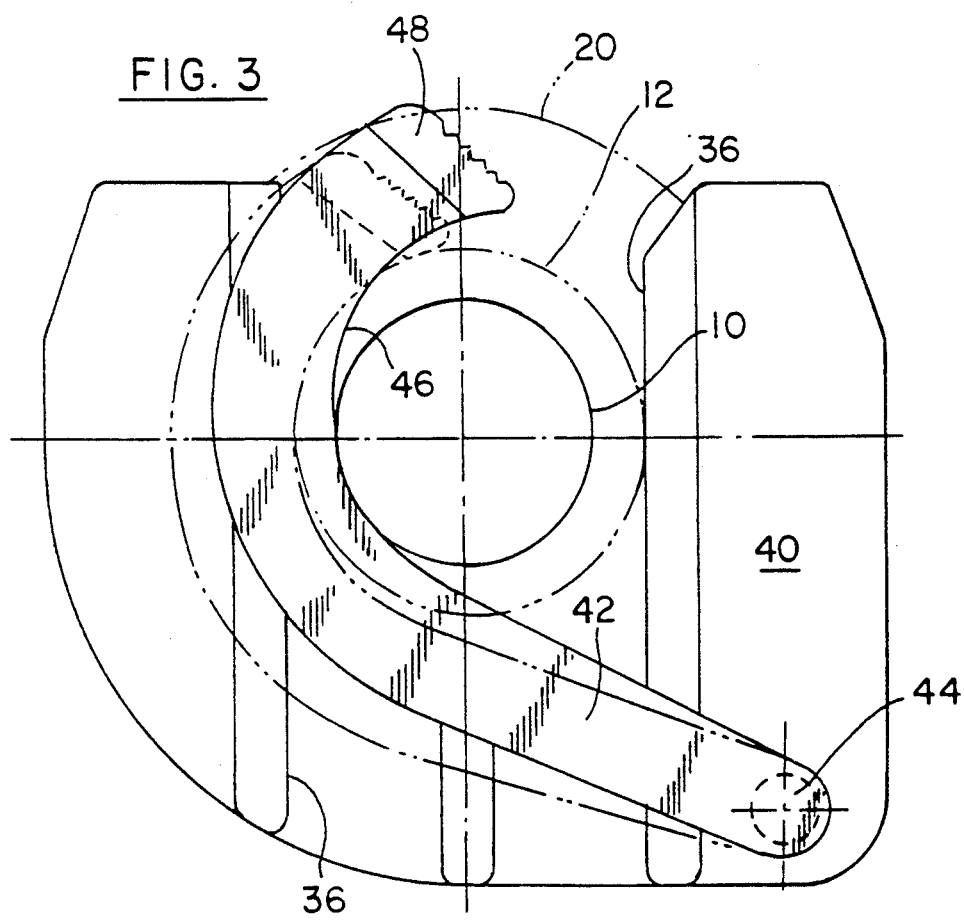

SECONDARY RETENTION CLIP WITH PIVOTING CLAMPING JAWS

The present invention relates to a secondary retention clip for an air conditioner hose.

Air conditioning hoses are configured by interconnecting a plurality of hose sections having male and female ends. These interconnected sections are effectively joined using a coupling flange and provision must be made to prevent the joined ends from completely separating in the event of joint failure. Such has traditionally been achieved by using a metal retention clip having opposed pairs of legs which is located over the joint. One of these leg pairs forcefully grips the larger of the tubes leading into the joint and the second leg pair does not engage the smaller of these tubes since it moves with the associated leg of the other pair. The metal retention clip has thin side walls that capture the coupling flange so that the tubes cannot be fully separated if the join fail.

It is an object of the present invention to provide an improved secondary retention clip for such applications and similar applications such as fuel line joints.

Other objects and advantages of the present invention will become apparent from the following portion of this specification and from the accompanying drawings which illustrate in accordance with the mandate of the patent statutes a presently preferred embodiment incorporating the principles of the invention.

Referring to the drawings:

FIG. 1 is an oblique, partially separated view of a secondary retention clip made in accordance with the teachings of the present invention;

FIG. 2 is a side cross sectional view of joined ends of an air conditioner hose; and FIG. 3 is an end view of the secondary retention clip.

Air conditioner hose is configured by attaching, in series, a number of sections each having a male end 10 and a female end 12. The female end 12 is outwardly flared 14 and the male end has a smaller outer diameter portion 16 supporting a plurality of "O" rings 18 for establishing a seal with the inner diameter of the female end 12. Also secured near the end of the female member is a coupling flange 20 which is to receive the outwardly flared end 14 of the female end. The coupling is effected by locating an annular coiled spring 22 between the flared end 14 and the coupling flange 20.

The retention clip 30 is one piece and made of plastic. It is box shaped having interior side walls 32 which are spaced apart a distance X which corresponds to the width of the coupling flange 20 which is to be located therebetween. These side walls 32 have an opening 34 to permit the connected tubes to extend therethrough. The vertical sides 36 of these openings have a substantial width Y and are separated by a dimension Z which substantially corresponds to the outer diameter of the female end 12 of the tube.

As can be seen from FIG. 2, the flared portion 14 of the female end 12 should be located within the coupling flange 20. Should the proper connection not be made and any portion of this flared portion 14 be located in the vicinity of the side walls 36, the coupling flange cannot be pushed into the retention clip since the outer diameter W of this flared portion will be larger than the separation Z between the sides preventing insertion. To maximize the likelihood that such an error will be caught, the width X of the coupling receiving box corresponds to the width of the coupling flange 20.

Secured at either side 40 of the box 41 are a pair of pivotally displaceable clamping arms 42 which are connected to the box side walls 40 via short posts 44. Each clamping arm has a curved interior surface 46 which in its original location is in interference with either end of the tube and which when deflected by the tubes as the coupling flange is pushed into the receptacle will engage either the larger female tube end 12 or the smaller male tube end 10. The clamping arm 42 which engages the larger tube exerts a clamping force downwardly substantially through the center line of the clamped tube. The clamping arm 42 which forcefully engages the smaller tube 10 will prevent vibration or rattling of the hose. Variable size tubes can be accordingly clamped and negatives like squeak and rattle are eliminated. Finger engaging pads 48 are located at the free ends of these clamping arms to facilitate installation and removal of the retention clip.

We claim:

1. A secondary retention clip for preventing the complete separation of the female end of an air conditioning hose from a connected male end of the air conditioning hose, wherein the female end is outwardly flared and the male end includes a coupling flange for receiving the flared end comprising
   a box like housing including opposed side walls selectively spaced apart a distance substantially equal to the width of the coupling flange, said housing being open at the top for receiving the coupling flange,
   said opposed side walls each having an opening communicating at the open top of the box for receiving the male and female ends of the connected hose,
   opposed stop means projecting outwardly from said side walls for preventing the placement of the flared end of the female end in said opening, and
   pivotally displaceable clamping jaws for forcefully engaging the male and female ends when said coupling flange is located in said box.

2. A secondary retention clip according to claim 1, wherein said clamping jaws each include pad means for facilitating displacement.

3. A secondary retention clip according to claim 1, wherein said stop means comprises opposed parallel walls defining said portion of said side wall openings.

* * * * *